United States Patent
Hosoya et al.

(10) Patent No.: US 9,221,987 B2
(45) Date of Patent: Dec. 29, 2015

(54) NON-AQUEOUS PIGMENT INK

(75) Inventors: Tetsuo Hosoya, Ibaraki-ken (JP); Akiko Yamamoto, Ibaraki-ken (JP); Asayo Nishimura, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 13/882,117

(22) PCT Filed: Oct. 17, 2011

(86) PCT No.: PCT/JP2011/005783
§ 371 (c)(1),
(2), (4) Date: Apr. 26, 2013

(87) PCT Pub. No.: WO2012/060060
PCT Pub. Date: May 10, 2012

(65) Prior Publication Data
US 2013/0220171 A1    Aug. 29, 2013

(30) Foreign Application Priority Data

Nov. 1, 2010 (JP) ................................. 2010-245159
Dec. 22, 2010 (JP) ................................. 2010-285455

(51) Int. Cl.
*C09D 11/02* (2014.01)
*C09D 11/36* (2014.01)
*C09C 1/56* (2006.01)
*C09D 11/322* (2014.01)
*C09D 11/324* (2014.01)

(52) U.S. Cl.
CPC . *C09D 11/36* (2013.01); *C09C 1/56* (2013.01); *C09D 11/322* (2013.01); *C09D 11/324* (2013.01); *C01P 2006/22* (2013.01)

(58) Field of Classification Search
CPC ........................................................ C09D 11/36
USPC ..................................................... 106/31.6
See application file for complete search history.

(56) References Cited

U.S. PATENT DOCUMENTS

| | | | |
|---|---|---|---|
| 5,702,512 A | 12/1997 | Yano et al. | |
| 6,336,965 B1 | 1/2002 | Johnson et al. | |
| 2001/0003263 A1 | 6/2001 | Johnson et al. | |
| 2001/0004871 A1 | 6/2001 | Johnson et al. | |
| 2002/0056403 A1 | 5/2002 | Johnson et al. | |
| 2003/0192453 A1 | 10/2003 | Ohkawa et al. | |
| 2004/0043691 A1 | 3/2004 | Abe et al. | |
| 2004/0254265 A1* | 12/2004 | Mizutani et al. | 523/160 |
| 2005/0215664 A1* | 9/2005 | Elwakil et al. | 523/160 |
| 2006/0178447 A1* | 8/2006 | Burns et al. | 523/160 |
| 2008/0145560 A1 | 6/2008 | Khaselev et al. | |
| 2009/0213163 A1 | 8/2009 | Bansyo | |
| 2010/0180795 A1* | 7/2010 | Ezaki et al. | 106/31.13 |
| 2012/0275012 A1* | 11/2012 | Zhou et al. | 359/296 |
| 2013/0307899 A1* | 11/2013 | Saito et al. | 347/21 |

FOREIGN PATENT DOCUMENTS

| | | |
|---|---|---|
| JP | 08-231915 A | 9/1996 |
| JP | 2002-053768 A | 2/2002 |
| JP | 2002-510736 A | 4/2002 |
| JP | 2002-169486 A | 6/2002 |
| JP | 2004-002666 A | 1/2004 |
| JP | 2005-179482 A | 7/2005 |
| JP | 2005-350563 A | 12/2005 |
| JP | 2007-314651 A | 12/2007 |
| JP | 2009-196208 A | 9/2009 |
| JP | 2010-504409 A | 2/2010 |

OTHER PUBLICATIONS

International Search Report; PCT/JP2011/005783; Dec. 13, 2011.
An Office Action; "Notice of Grounds for Rejection," issued by the Japanese Patent Office on Sep. 2, 2014, which corresponds to Japanese Patent Application No. 2010-245159 and is related to U.S. Appl. No. 13/882,117; with English language partial translation.
An Office Action; "Notification of Grounds for Rejection," issued by the Japanese Patent Office on Sep. 24, 2014, which corresponds to Japanese Patent Application No. 2010-285455 and is related to U.S. Appl. No. 13/882,117; with English language partial translation.

* cited by examiner

*Primary Examiner* — Veronica F Faison
(74) *Attorney, Agent, or Firm* — Studebaker & Brackett PC

(57) ABSTRACT

A the non-aqueous pigment ink containing at least a non-aqueous solvent and a pigment that is self-dispersed in the solvent, wherein the self-dispersed pigment is treated with a compound represented by R1-X or R2-Y-R3, where X is any of —SH, —NCO, —NH2 and —NHR (where R is an alkyl group), Y is any of —CO—O—O—CO— and —CO—O—O—, R1, R2 and R3 are alkyl groups with a carbon number of 8-22, the alkyl groups may be linear or branched, and R2 and R3 may be the same with or different from each other. Alternatively, the non-aqueous inkjet ink may contain at least a non-aqueous solvent and a pigment that is self-dispersed in the solvent, wherein a content of a polymer component in the ink is 20 mass % or less relative to the pigment, and the ink has a specific heat of 3.0 J/(g·K) or less.

20 Claims, No Drawings

NON-AQUEOUS PIGMENT INK

BACKGROUND OF THE INVENTION

1. Field of the Invention

A first aspect of the present invention relates to a non-aqueous ink that is suitable for use with an inkjet recording system, and specifically to a non-aqueous pigment ink that is highly effective to eliminate or reduce striking through and achieves high print density.

A second aspect of the invention relates to a non-aqueous ink that is suitable for use with an inkjet recording device, and in particular to a non-aqueous inkjet ink that is suitable for use with an ink circulation type inkjet recording device which performs printing by ejecting an ink circulating therein from an ink head.

2. Description of the Related Art

An inkjet recording system ejects a highly fluid inkjet ink as an ink particle from a very thin head nozzle to record an image on a sheet of printing paper, which is positioned to face the nozzle. Because of low noise and ability of high-speed printing, the inkjet recording systems are rapidly becoming widely used in recent years. As inks for use with the inkjet recording systems, so-called non-aqueous pigment inks, which are formed by finely dispersing a pigment in a non-water-soluble solvent, are known.

The non-aqueous pigment inks typically use a pigment dispersant for ensuring dispersion stability of the pigment. Therefore, after the ink has transferred onto a printing paper sheet, the solvent in the ink penetrates into the paper sheet, and the pigment penetrates into the paper sheet together with the solvent. This results in low print density and high level of striking through and is therefore problematic. The pigment dispersant has high affinity with the solvent and the pigment, and therefore the pigment tends to penetrate into the paper sheet when the solvent penetrates into the paper sheet. In order to address this problem, it is conceivable that use of an encapsulated pigment, wherein the pigment is surface treated with a polymer, such as one taught in Japanese Unexamined Patent Publication No. 2007-314651 (hereinafter, Patent Document 1), would allow keeping the pigment on the surface of the paper sheet, thereby eliminating or reducing the striking through.

On the other hand, as a non-aqueous inkjet ink (non-aqueous ink) suitable for use with an inkjet recording device that performs printing on a recording medium, such as a printing paper sheet, by ejecting an ink from a nozzle of an ink head, an ink containing a pigment, a pigment dispersant (polymer component) and a specific organic solvent, such as one taught in Japanese Unexamined Patent Publication No. 2004-2666 (hereinafter, Patent Document 2) is known. This type of ink is less likely to cause clogging of the nozzle and thus facilitates maintenance.

Among inkjet recording devices, there are ink circulation-type inkjet recording devices, in which the ink is always circulated during the printing state to cool the ink and remove dusts in the ink flow path. In the case of a line-type inkjet recording device which does not include a circulation-type head, defective ejection often influences the image quality. In contrast, in the case of a line-type inkjet recording device, which includes a circulation-type head and can circulate the ink through the path, the ink in the head is circulated and possibility of clogging of the head nozzle with an air bubble or foreign matter is low, and therefore the defective ejection is advantageously reduced.

However, temperature dependency of the ink viscosity of the non-aqueous inks tend to be higher than that of aqueous inks. Therefore, if an ink viscosity at room temperature is set at the center of an ejectable viscosity range, ink viscosities at lower temperatures tend to be out of the ejectable viscosity range, and it is necessary to warm up (heat) the ink to control the viscosity of the ink to be within the ejectable viscosity range.

The line-type inkjet recording device including the circulation-type head has the merit of lower possibility of defective ejection, as described above; however, has a demerit of long warm up time in a low temperature environment, since all the ink circulating in the inkjet recording device passes through the head and therefore a large amount of ink have to be warmed up. In order to address this problem, the present applicant has proposed, in Japanese Unexamined Patent Publication No. 2009-196208 (hereinafter, Patent Document 3), an inkjet recording device which changes the amount of circulating ink depending on the temperature of the circulating ink in the ink circulation path to reduce the time required for raising the temperature of the circulating ink to a prescribed temperature (which may hereinafter also be referred to as "time required for warming up").

SUMMARY OF THE INVENTION

The encapsulated pigment taught in Patent Document 1 is produced by desolventizing a low-boiling point polar solvent in an aqueous medium (coacervation). This requires a significantly complicated process, and is therefore not practical. Further, the encapsulating polymer has high polarity, and therefore the non-aqueous solvent used in the ink is limited to those having high polarity. In a case of an ink containing a high ratio of a low-polarity solvent, the ink viscosity becomes high if the pigment content is high, resulting in new problems of instable ejection property and low print density.

In view of the above-described circumstances, a first aspect of the present invention is directed to providing a non-aqueous pigment ink, which can eliminate or reduce the striking through while ensuring the pigment dispersion stability and the ejection stability, thereby achieving high print density.

Further, use of the inkjet recording device taught in Patent Document 3 allows reducing the time required for warming up. However, if an inkjet recording device with a conventional circulation-type head is used, it is necessary to replace the conventional inkjet recording device with the new inkjet recording device. Therefore, there is a demand for reducing the time required for warming up by replacing the ink without spending a cost for replacing the device.

It is conceivable that the time required for warming up the ink can be reduced by providing the ink with a smaller specific heat. However, in order to ensure the dispersibility of the pigment, etc., it is necessary to use a polymer component to disperse the pigment. In this case, however, using a lot of polymer component results in increased ink viscosity, and it is difficult to ensure the ink ejection performance.

In view of the above-described circumstances, a second aspect of the present invention is directed to providing a non-aqueous inkjet ink, which can reduce the time required for warming up the ink while ensuring the pigment dispersion stability and the ejection stability.

The non-aqueous pigment ink of the first aspect of the invention is a non-aqueous pigment ink containing at least a non-aqueous solvent and a pigment that is self-dispersed in the solvent, wherein the self-dispersed pigment is treated with a compound represented by $R^1$—X or $R^2$—Y—$R^3$, where X is any of —SH, —NCO, —$NH_2$ and —NHR (where R is an alkyl group), Y is any of —CO—O—O—CO— and —CO—O—O—, $R^1$, $R^2$ and $R^3$ are alkyl groups with a carbon number of 8-22, the alkyl groups may be linear or branched, and $R^2$ and $R^3$ may be the same with or different from each other.

It may be preferable that the pigment is carbon black.

It may be preferable that the non-aqueous solvent is a non-polar organic solvent and/or a polar organic solvent, and has a 50% distillation point of 150° C. or more.

The non-aqueous inkjet ink of the second aspect of the invention is a non-aqueous inkjet ink containing at least a non-aqueous solvent and a pigment that is self-dispersed in the solvent, wherein a content of a polymer component in the ink is 20 mass % or less relative to the pigment, and the ink has a specific heat of 3.0 J/(g·K) or less.

It may be preferable that the self-dispersed pigment is treated with a compound represented by $R^1$—X or $R^2$—Y—$R^3$, where X is any of —SH, —NCO, —NH$_2$ and —NHR (where R is an alkyl group), Y is any of —CO—O—O—CO— and —CO—O—O—, $R^1$, $R^2$ and $R^3$ are alkyl groups with a carbon number of 8-22, the alkyl groups may be linear or branched, and $R^2$ and $R^3$ may be the same with or different from each other.

It may be preferable that the ink has a specific heat of 2.5 J/(g·K) or less.

It may be preferable that the non-aqueous solvent is a higher fatty acid ester and/or a hydrocarbon solvent, and the non-aqueous solvent is present in an amount of 50 mass % or more of the total amount of solvent. It may be more preferable that the non-aqueous solvent is a hydrocarbon solvent, and the non-aqueous solvent is present in an amount of 50 mass % or more of the total amount of solvent.

It may be preferable that the pigment is carbon black.

The non-aqueous pigment ink of the first aspect of the invention is a non-aqueous pigment ink containing at least a non-aqueous solvent and a pigment that is self-dispersed in the solvent, wherein the self-dispersed pigment is treated with a compound represented by $R^1$—X or $R^2$—Y—$R^3$, where X is any of —SH, —NCO, —NH$_2$ and —NHR (where R is an alkyl group), Y is any of —CO—O—O—CO— and —CO—O—O—, $R^1$, $R^2$ and $R^3$ are alkyl groups with a carbon number of 8-22, the alkyl groups may be linear or branched, and $R^2$ and $R^3$ may be the same with or different from each other. Therefore, a long-chain alkyl group is introduced as a graft chain onto the surface of the pigment. As a result, the striking through can be eliminated or reduced while ensuring the dispersion stability and the ejection stability of the pigment, thereby achieving printing with high print density.

The non-aqueous inkjet ink of the second aspect of the invention contains a pigment that is self-dispersed in a non-aqueous solvent. Therefore, the dispersion stability and the ejection stability of the pigment can be ensured even when the content of a polymer component, which is typically used to disperse the pigment in a non-aqueous ink, is 20 mass % or less relative to the pigment. Since the content of the polymer component is low, the increase of the ink viscosity in a low temperature environment is reduced, thereby reducing variation of the ink viscosity. As a result, the time required for warming up the ink to control the ink viscosity to be within the ejectable viscosity range can be reduced.

Further, since the ink has a specific heat of 3.0 J/(g·K) or less, the ink temperature can readily be raised. Therefore, the ink can be warmed up to be within the ejectable temperature range in a short time even in a low temperature environment, thereby allowing reducing the time required for warming up and saving the electric power used for the warming up.

In particular, by using a pigment that is treated with the compound represented by $R^1$—X or $R^2$—Y—$R^3$, where X is any of —SH, —NCO, —NH$_2$ and —NHR (where R is an alkyl group), Y is any of —CO—O—O—CO— and —CO—O—O—, $R^1$, $R^2$ and $R^3$ are alkyl groups with a carbon number of 8-22, the alkyl groups may be linear or branched, and $R^2$ and $R^3$ may be the same with or different from each other, the used amount of a polymeric dispersant, which is typically used to disperse the pigment in a non-aqueous ink, can be reduced, thereby reducing the content of the polymer component.

DESCRIPTION OF THE PREFERRED EMBODIMENTS

A non-aqueous pigment ink of a first aspect of the present invention (which may hereinafter simply be referred to as "ink of the first aspect") contains at least a non-aqueous solvent and a pigment that is self-dispersed in the solvent, wherein the self-dispersed pigment is treated with a compound represented by $R^1$—X or $R^2$—Y—$R^3$, where X is any of —SH, —NCO, —NH$_2$ and —NHR (where R is an alkyl group), Y is any of —CO—O—O—CO— and —CO—O—O—, $R^1$, $R^2$ and $R^3$ are alkyl groups with a carbon number of 8-22, the alkyl groups may be linear or branched, and $R^2$ and $R^3$ may be the same with or different from each other.

In the ink of the first aspect of the invention, a long-chain alkyl group ($R^1$ or $R^2$ and $R^3$) is introduced as a graft chain onto the surface of the pigment by treating the pigment with the compound represented by $R^1$—X or $R^2$—Y—$R^3$. Specifically, in the case of the compound represented by the general formula $R^1$—X, X in the general formula reacts with a functional group at the surface of the pigment, and $R^1$ is introduced as a graft chain onto the surface of the pigment. In the case of the compound represented by the general formula $R^2$—Y—$R^3$, radical cleavage of Y in the general formula causes $R^2$ and $R^3$ to be introduced as graft chains onto the surface of the pigment due to the radical capturing ability of the pigment (a condensed aromatic ring of the pigment has a nature to selectively capture and bind with various radicals). This renders the pigment self-dispersed in the non-aqueous solvent, thereby allowing elimination or reduction of the striking through while ensuring the dispersion stability and the ejection stability, and achieving printing with high print density.

More specifically, when a hydroxyl group or a carboxylic group is present at the surface of the pigment, the pigment is treated with a compound represented by the general formula $R^1$—X where X is —NCO (isocyanate group), —NH$_2$ (amino group), —NHR (where R is an alkyl group with a carbon number 1 to 22, and the alkyl group may be linear or branched), so that $R^1$ is introduced as a graft chain onto the surface of the pigment by urethanization of the isocyanate group if X is —NCO, or by salt formation of the amino group if X is —NH$_2$ or —NHR.

In the case of the compound represented by the general formula $R^2$—Y—$R^3$, even when a specific functional group, such as those described above, is not present at the surface of the pigment, radical cleavage of Y in the general formula (for example, if Y is —CO—O—O—CO—, $R^2$—CO—O—O—CO—$R^3$ is cleaved into $R^2$—COO. and R3-COO.) causes $R^2$ and $R^3$ (or $R^2$—COO and $R^3$—COO) to be introduced as graft chains onto the surface of the pigment by the radical capturing ability of the pigment. In the case of the compound represented by the general formula $R^1$—X, if X is —SH (thiol group), $R^1$ is introduced as a graft chain onto the surface of the pigment via the thiol group.

In the general formulae, $R^1$, $R^2$ and $R^3$ are alkyl groups with a carbon number of 8-22. The alkyl groups may be linear or branched, and $R^2$ and $R^3$ may be the same with or different from each other. The alkyl groups at $R^1$, $R^2$ and $R^3$ may be saturated or unsaturated, and preferably include no functional group that reacts with the chromophore group of the pigment. Preferred examples of $R^1$, $R^2$ and $R^3$ may include octyl, 2-ethylhexyl, dodecyl, myristyl, cetyl, stearyl, isostearyl, behenyl, oleyl, etc.

Each of the compound represented by the general formula $R^1$—X and the compound represented by the general formula $R^2$—Y—$R^3$ has a molecular weight of 400 or less. The grafting of the compound having a relatively low molecular weight allows stable pigment dispersion without increasing the ink viscosity. The content of the compound represented by the general formula $R^1$—X or $R^2$—Y—$R^3$ relative to the pigment may preferably be in the range from 0.1:1 to 30:1, or more preferably in the range from 0.2:1 to 10:1 in mass ratio.

Examples of the compound represented by the general formula $R^1$—X may include octyl isocyanate (MW 155), dodecyl isocyanate (MW 202), stearyl isocyanate (MW 296), octyl amine (MW 129), dodecyl amine (MW 185), stearyl amine (MW 270), octane thiol (MW 146), dodecane thiol (MW 202), and octadecane thiol (MW 287). Examples of the compound represented by the general formula $R^2$—Y—$R^3$ may include dilauroyl peroxide, aliphatic diacyl peroxide, such as bis(3,5,5-trimethyl hexanoyl peroxide) (PEROYL (R) L (MW 399), PEROYL 355 (MW 314), commercially available from NOF Corporation), aliphatic dialkyl peroxy ester of 1,1,3,3-tetramethylbutyl peroxy neodecanoate (PEROCTA ND (MW 300), commercially available from NOF Corporation), and aliphatic peroxy dicarbonate of di-(2-ethylhexyl) peroxy dicarbonate (PEROYL OPP (MW 346), commercially available from NOF Corporation).

The treatment of the pigment with the compound represented by $R^1$—X or $R^2$—Y—$R^3$ to introduce $R^1$ or $R^2$ and $R^3$ as a graft chain onto the surface of the pigment can be achieved by reacting the pigment with the compound represented by the general formula $R^1$—X or $R^2$—Y—$R^3$ in an organic solvent in a nitrogen atmosphere. The organic solvent may be a naphthene-based solvent, such as AF-4, AF-5, AF-6, AF-7 (which are available from JX Nippon Oil & Energy Corporation), an ester solvent, such as IOP (isooctyl palmitate, available from Nikko Chemicals Co., Ltd.), EXEPARL MOL (methyl oleate, available from Kao Corporation), CETIOL A (hexyl laurate, available from COGNIS), etc.

It may be preferable that the non-aqueous solvent is a non-polar organic solvent and/or a polar organic solvent, and has a 50% distillation point of 150° C. or more and 300° C. or less. The 50% distillation point is measured according to the JIS K0066, "Test Methods for Distillation of Chemical Products", and refers to a temperature at which 50% by mass of the solvent has volatilized. In view of safety, it is preferred to use a solvent having a 50% distillation point of 160° C. or more, or preferably 230° C. or more.

Specifically, examples of the non-polar organic solvent may include an aliphatic hydrocarbon solvent, an alicyclic hydrocarbon-based solvent, an aromatic hydrocarbon solvent, etc. Examples of the aliphatic hydrocarbon solvent and the alicyclic hydrocarbon-based solvent may include: TECLEAN N-16, TECLEAN N-20, TECLEAN N-22, NISSEKI NAPHTESOL L, NISSEKI NAPHTESOL M, NISSEKI NAPHTESOL H, NO. 0 SOLVENT L, NO. 0 SOLVENT M, NO. 0 SOLVENT H, NISSEKI ISOSOL 300, NISSEKI ISOSOL 400, AF-4, AF-5, AF-6 and AF-7 available from JX Nippon Oil & Energy Corporation; ISOPAR G, ISOPAR H, ISOPAR L, ISOPAR M, EXXSOL D40, EXXSOL D80, EXXSOL D100, EXXSOL D130 AND EXXSOL D140 available from Exxon, etc. Examples of the aromatic hydrocarbon solvent may include NISSEKI CLEANSOL G (alkyl benzene) available from JX Nippon Oil & Energy Corporation, SOLVESSO 200 available from Exxon, etc.

The polar organic solvent may be an ester-based solvent with a carbon number in a molecule of 14 or more, or a mixed solvent of such ester-based solvents. More specifically, examples of the polar organic solvent may include methyl laurate, hexyl laurate, isopropyl myristate, isopropyl palmitate, isostearyl palmitate, isooctyl palmitate, methyl oleate, ethyl oleate, isopropyl oleate, butyl oleate, methyl linoleate, isobutyl linoleate, ethyl linoleate, isopropyl isostearate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylol propane tri-2-ethylhexanoate, glyceryl tri-2-ethylhexanoate, etc.

These non-aqueous solvents may be used singly or in combination of two or more, as appropriate. The content of the non-aqueous solvent may preferably be in the range from 75 to 99.5 mass % relative to the total amount of the ink. The content ratio of the polar organic solvent to the non-polar organic solvent may preferably be in the range from 0:1 to 5:1.

A non-aqueous inkjet ink of a second aspect of the invention (which may hereinafter simply be referred to as "ink of the second aspect") contains at least a non-aqueous solvent and a pigment that is self-dispersed in the solvent, wherein the content of a polymer component in the ink is 20 mass % or less relative to the pigment, and the ink has a specific heat of 3.0 J/(g·K) or less.

If the content of the polymer component exceeds 20 mass %, it is difficult to ensure the pigment dispersion stability even with a self-dispersed pigment. The content of the polymer component is more preferably 10 mass % or less, or even more preferably 5 mass % or less relative to the pigment, and it is desirable that substantially no polymer component is contained. The description "substantially no polymer component is contained" refers to a case where no polymer component is contained, and also to a case where, for example, a polymer component is contained as inevitable impurities.

Examples of commercially-available polymer components may include SOLSPERSE series (SOLSPERSE 20000, 27000, 41000, 41090, 43000, 44000) available from The Lubrizol Corporation, JONCRYL series (JONCRYL 57, 60, 62, 63, 71, 501) available from BASF JAPAN LTD., polyvinylpyrrolidone K-30, K-90, available from Dai-Ichi Kogyo Seiyaku Co., Ltd., etc.

The pigment contained in the ink of the second aspect of the invention is self-dispersed in a non-aqueous solvent, and may preferably be the self-dispersed pigment in the ink of the first aspect.

By treating the pigment with a compound represented by $R^1$—X or $R^2$—Y—$R^3$, a long-chain alkyl group ($R^1$ or $R^2$ and $R^3$) is introduced as a graft chain onto the surface of the pigment. Specifically, in the case of the compound represented by the general formula $R^1$—X, X in the general formula reacts with a functional group at the surface of the pigment, and $R^1$ is introduced as a graft chain onto the surface of the pigment. In the case of the compound represented by the general formula $R^2$—Y—$R^3$, radical cleavage of Y in the general formula causes $R^2$ and $R^3$ to be introduced as graft chains onto the surface of the pigment due to the radical capturing ability of the pigment (a condensed aromatic ring of the pigment has a nature to selectively capture and bind with various radicals). This renders the pigment self-dispersed in the non-aqueous solvent, thereby ensuring the dispersion stability and the ejection stability.

The ink of the second aspect of the invention has a specific heat of 3.0 J/(g·K) or less, preferably 2.5 J/(g·K) or less, or more desirably 2.0 J/(g·K) or less. If the specific heat exceeds 3.0 J/(g·K), it is difficult to reduce the time required for warming up. In contrast, if the specific heat is excessively low, the temperature of the ink is rapidly raised and overheating may stop the printing operation. Therefore, it is more preferable that the specific heat of the ink is 1.5 J/(g·K) or more. The ink having the above-described specific heat can be prepared by selecting a non-aqueous solvent, which may be selected as appropriate from a higher fatty acid ester, a hydrocarbon solvent, a higher fatty acid, a higher alcohol, an ether, etc. In view of the reduction of the time required for warming up, however, it is preferred that a higher fatty acid ester and/or a hydrocarbon solvent is contained in an amount of 50 mass % or more of the total amount of solvent, and it is more preferable that a hydrocarbon solvent is contained in an amount of 50 mass % or more of the total amount of solvent.

Specifically, the hydrocarbon solvent may be the non-polar solvent in the ink of the first aspect. The higher fatty acid ester may be the polar organic solvent in the ink of the first aspect.

Examples of the alcohol solvent may include isomyristyl alcohol, isopalmityl alcohol, isostearyl alcohol, oleyl alcohol, etc.

The higher fatty acid solvent may preferably be a fatty acid with a carbon number of 8 to 24, and examples thereof may include isononanoic acid, isomyristic acid, isopalmitic acid, oleic acid, isostearic acid, etc.

Examples of the ether solvent may include diethyl glycol monobutyl ether, ethylene glycol monobutyl ether, propylene glycol monobutyl ether, propylene glycol dibutyl ether, etc.

These non-aqueous solvents may be used singly or in combination of two or more, as appropriate. The content of the non-aqueous solvent may preferably be in the range from 75 to 99.5 mass % relative to the total amount of ink.

The inks of the first and second aspects of the invention may contain conventionally known inorganic and organic pigments, as appropriate. Examples of the inorganic pigment may include titanium oxide, colcothar, cobalt blue, ultramarine, iron blue, carbon black, calcium carbonate, kaolin, clay, barium sulfate, talc and silica. Examples of the organic pigment may include insoluble azo pigment, azo lake pigment, condensed azo pigment, condensed polycyclic pigment and copper phthalocyanine pigment. These pigments may be used singly or in combination, as appropriate. The addition amount of the pigment may preferably be in the range from 0.5 to 20 mass % relative to the total amount of ink.

Besides the above-described components, the inks of the first and second aspects of the invention may include conventional additives. Examples of the additives may include a surfactant, such as an anionic, cationic, amphoteric or nonionic surfactant, an antioxidant, such as dibutylhydroxytoluene, propyl gallate, tocopherol, butylhydroxyanisol or nordihydroguaiaretic acid, etc.

The inks of the first and second aspects of the invention can be prepared, for example, by putting all the components at once or in fractions in a known dispersing device, such as a bead mill, to disperse the components, and filtering them with a known filtering device, such as a membrane filter, as desired.

Examples of the inks of the first and second aspects of the invention are shown below.

EXAMPLES

<Examples of the Ink of the First Aspect>
Preparation of Surface-treated Pigment P-1

In a 500 ml four-necked flask, 15.0 g of a pigment MA600 (carbon black, available from Mitsubishi Chemical Corporation), 5.6 g of PEROYL L (available from NOF Corporation), 135 g of AF-7 (naphthene-based solvent, available from JX Nippon Oil & Energy Corporation), 135 g of IOP (ester solvent, available from Nikko Chemicals Co., Ltd.) and 1000 g of zirconia beads having a diameter of 2 mm were put and stirred in a nitrogen atmosphere to achieve sufficient nitrogen replacement, and the temperature was raised to 100° C. to react the mixture for six hours. Then, the zirconia beads were removed, and the resulting dispersion solution was separated by a centrifugal separator to cause the surface-treated pigment to settle out (13,000 rpm, five minutes). Then, the settled out pigment is forcedly dispersed in methyl ethyl ketone (MEK) using a ultrasonic wave, and the resulting dispersion solution (MEK) was separated by the centrifugal separator again to cause the surface-treated pigment to settle out. This process was repeated three times, and the resulting surface-treated pigment was dried to completely remove MEK to provide a surface-treated pigment P-1. The resulting surface-treated pigment P-1 was measured with a TG/DTA (Thermogravimetric/Differential Thermal Analysis), and a ratio of the amount of the component bound to the surface of the pigment relative to the pigment was found to be 25% in mass ratio.

Preparation of Surface-Treated Pigments P-2 to P-4

Surface-treated pigments P-2 to P-4 were prepared in the same manner as described above at "Preparation of surface-treated pigment P-1", except that 5.6 g of PEROYL L was replaced with dodecyl isocyanate (available from Wako Pure Chemical Industries, Ltd.), dodecyl amine (available from Wako Pure Chemical Industries, Ltd.), and THIOKALCOL 20 (dodecyl mercaptan, available from Kao Corporation), respectively. For each of P-2, P-3 and P-4, the ratio of the amount of the component bound to the surface of the pigment relative to the pigment was measured with the TG/DTA, and was found to be 24%, 18%, 21% in mass ratio, respectively.

Preparation of Encapsulated Pigment

An encapsulated pigment was prepared according to the procedure taught in Japanese Unexamined Patent Publication No. 2007-314651, <Preparation Example 1>, except that carbon black was replaced with MA600 (carbon black, available from Mitsubishi Chemical Corporation).

Preparation of Ink

Raw materials according to each composition shown in Table 1 below (the numerical values shown in Table 1 are parts by mass) were premixed to provide a pigment concentration of 20 mass %, and then, each mixture was dispersed with a residence time of 12 minutes and was diluted with viscosity controlling solvents shown in Table 1 to prepare ink samples with a pigment concentration of 10 mass % of Examples 1 to 4 and Comparative Examples 1 and 2.

Evaluation
Print Density and Striking Through

Each ink sample was charged in an inkjet recording device, ORPHIS-X9050, and a solid image, which was equivalent to 300×300 dpi with 30 pl, was printed on printing paper sheets, RISO paper (thin type) (available from Riso Kagaku Corporation). As the print density, a front side OD value of each printing paper sheet 24 hours after the printing of the solid image was measured and evaluated according to the following criteria. As the striking through, a back side OD value of each printing paper sheet 24 hours after the printing of the solid image was measured and evaluated according to the following criteria. The OD values were measured using a Macbeth densitometer (RD920, available from Macbeth).

Evaluation of the Print Density (Front Side OD)
  Good: The OD value was 1.11 or more.
  Acceptable: The OD value was 1.00 or more and less than 1.11.
  Bad: The OD value was less than 1.00.

Evaluation of the Striking Through (Back Side OD)
  Good: The OD value was less than 0.20.
  Acceptable: The OD value was 0.20 or more and less than 0.30.
  Bad: The OD value was 0.30 or more.

Storage Stability

The viscosity of each of the ink samples of Examples 1 to 4 and Comparative Examples 1 and 2 was measured as follows. A rheometer RS75, available from Haake, and a 6 cm-diameter cone were used to measure the viscosity at a temperature of 23° C. and under a shearing stress of 100 (1/s), where the shearing stress was increased from 0.7 to 100 (1/s) in 60 seconds. Each ink sample was put in a glass bottle by an amount of 50 ml, and left for one month in an environment of 70° C. Then, the viscosity was measured again and was evaluated according to the following criteria.
  Good: The viscosity change rate was smaller than ±5%.
  Acceptable: The viscosity change rate was ±5% or greater and smaller than ±10%.
  Bad: The viscosity change rate was ±10% or greater.

The formulation and the results of the evaluations of each ink sample are shown in Table 1.

encapsulated pigment, had high ink viscosity when the pigment content was high in a low-polarity solvent, and failed to provide ejection stability and resulted in low print density. It should be noted that, although carbon black was used as the pigment in the Examples of the present invention, it is estimated that the pigment dispersion effect by grafting a long-chain alkyl group onto the surface of the pigment will be achieved when other pigments are used.

As described above, the ink of the first aspect of the invention allows the elimination or reduction of the striking through while ensuring the pigment dispersion stability and the ejection stability, thereby achieving the high print density.

<Examples of the Ink of the Second Aspect>

Preparation of Ink

The surface-treated pigments P-1 to P-4 were prepared in the same manner as described above at "Preparation of surface-treated pigment P-1" and "Preparation of surface-treated pigments P-2 to P-4" of "<Examples of the ink of the first aspect>". Raw materials according to each composition shown in Table 2 (the numerical values shown in Table 2 are parts by mass) were premixed, each mixture was dispersed with a residence time of 12 minutes, and filtered with a membrane filter having a pore size of 3 μm to prepare ink samples of Examples 1 to 8 and Comparative Examples 1 and 2.

Method for Measuring Specific Heat

DSC measurement was performed using DSC8230L (available from Rigaku Co., Ltd.), and the specific heat was calculated according to Equation (1) below:

TABLE 1

| | | Example 1 | Example 2 | Example 3 | Example 4 | Comp. Example 1 | Comp. Example 2 |
|---|---|---|---|---|---|---|---|
| Pigment | MA600 (carbon black, available from Mitsubishi Chemical Corporation) | | | | | 10.0 | |
| Surface-treated pigment | P-1 (surface-treated with PEROYL L) | 12.5 | | | | | |
| | P-2 (surface-treated with dodecyl isocyanate) | | 12.5 | | | | |
| | P-3 (surface-treated with dodecyl amine) | | | 12.5 | | | |
| | P-4 (surface-treated with dodecyl mercaptan) | | | | 12.5 | | |
| | Encapsulated pigment | | | | | | 15.0 |
| Pigment dispersant | SOLSPERSE 28000 (available from The Lubrizol Corporation, 100% solids) | | | | | 5.0 | |
| Dispersing solvent | AF-7 (naphthene-based solvent, available from JX Nippon Oil & Energy Corporation) | 16.25 | 16.25 | 16.25 | 16.25 | 15.0 | 15.0 |
| | IOP (isooctyl palmitate, available from Nikko Chemicals Co., Ltd.) | 16.25 | 16.25 | 16.25 | 16.25 | 15.0 | 15.0 |
| | FOC-140N (isomyristyl alcohol, available from Nissan Chemical Industries, Ltd.) | 5.0 | 5.0 | 5.0 | 5.0 | 5.0 | 5.0 |
| Viscosity controlling solvent | AF-7 | 25.0 | 25.0 | 25.0 | 25.0 | 25.0 | 25.0 |
| | IOP | 25.0 | 25.0 | 25.0 | 25.0 | 25.0 | 25.0 |
| Total | | 100.0 | 100.0 | 100.0 | 100.0 | 100.0 | 100.0 |
| Evaluation | Print density (front side OD) | Good | Good | Good | Good | Bad | Bad |
| | Striking through (back side OD) | Good | Good | Good | Good | Bad | Bad |
| | Storage stability (70° C., 1M) | Good | Good | Acceptable | Acceptable | Good | Bad |

As shown in Table 1, the ink of the first aspect of the invention achieved higher print density on the surface of the printing paper sheet and lower level of striking through than the ink containing a conventional pigment dispersant (Comparative Example 1). Comparative Example 2, which used the $$Cp = [(STW \times SAH)/(SAW \times STH)] \times STCP \quad (1)$$

where STW is the weight of an authentic sample (alumina), SAW is the weight of each measured sample, SAH is the amount of baseline shift of the measured sample, STH is the amount of baseline shift of the authentic sample, and STCP is the specific heat capacity of the authentic sample at a temperature T1 (0.8 for alumina).

Evaluation

Time Required for Warming Up

A commercially available X INK (available from Riso Kagaku Corporation, having a specific heat of 2.1 J/(g·K)) was charged in a line-type inkjet recording device with a circulation-type head, ORPHIS-X (available from Riso Kagaku Corporation), and a range of driving voltage that allows ejection at room temperature (23° C.) was found, where a driving voltage at the center of the range of driving voltage that allows ejection was referred to as a driving voltage Vc. Then, the inkjet recording device was left for 24 hours in an environment of 15° C. Thereafter, an instruction to perform printing was made in the environment of 15° C., and a time (reference) taken until it became able to print with the driving voltage Vc was found.

The time required for warming up was found in the same manner as described above for each of the ink samples of Examples 1 to 8 and Comparative Example 1, and relative evaluation relative to the reference was made as follows.

Good: The required time was remarkably shorter than the reference.

Acceptable: The required time was slightly shorter than the reference.

Bad: The required time was equal to or longer than the reference.

Dispersion Stability

Each of the ink samples of Examples 1 to 8 and Comparative Examples 1 and 2 was put in SV50 (a glass container) by an amount of 40 g, and was left for one week in an environment of 50° C. Thereafter, whether or not there was sedimentation was observed and evaluated according to the following criteria.

Good: No sedimentation was observed at the bottom surface.

Bad: Sedimentation was observed at the bottom surface.

The formulation and the results of the evaluations of each ink sample are shown in Table 2.

As can be seen from Table 2, Examples 1 to 8 using the surface-treated pigments had a long-chain alkyl group (an alkyl group with a carbon number of 12) introduced thereto, and therefore were able to ensure the pigment dispersion stability in a low-polarity solvent, such as naphthene, without adding a polymer component thereto. Further, a specific heat of 3.0 J/(g·K) or less was achieved in Examples 1 to 8. Thus, it became able to reduce the time required for warming up the ink while ensuring the pigment dispersion stability and the ejection stability.

In contrast, as can be seen from Comparative Example 1, when a polymer component was added, the reduction of the time required for warming up was not achieved even with the specific heat of 2.1 J/(g·K). This is because that the addition of the polymer component increased the viscosity, and a longer time was required for warming up to control the viscosity to be within the ejectable viscosity range. The ink sample of Comparative Example 1 had the same specific heat as that of the X INK, which was used as the reference, and this shows that the reduction of the time required for warming up cannot be achieved only by controlling the specific heat. Further, Comparative Example 2, which did not contain a polymer component, was naturally not able to ensure the dispersion stability (for this reason, the time required for warming up of Comparative Example 2 was not evaluated).

In Examples 1 to 4, the amount of the higher fatty acid ester and the hydrocarbon solvent was 91.4 mass % relative to the total solvent, where the amount of the hydrocarbon solvent was 45.7 mass % relative to the total solvent. In Example 5, the amount of the higher fatty acid ester and the hydrocarbon solvent was 91.4 mass % relative to the total solvent, where the amount of the hydrocarbon solvent was 0 mass % relative to the total solvent. In Example 6, the amount of the higher fatty acid ester and the hydrocarbon solvent was 45.7 mass % relative to the total solvent, where the amount of the hydrocarbon solvent was 0 mass % relative to the total solvent. In Examples 7 and 8, the amount of the higher fatty acid ester and the hydrocarbon solvent was 100 mass % relative to the total solvent, where the amount of the hydrocarbon solvent was 100 mass % relative to the total solvent. It is believed,

TABLE 2

|  |  | Example 1 | Example 2 | Example 3 | Example 4 | Example 5 | Example 6 | Example 7 | Example 8 | Comp. Example 1 | Comp. Example 2 |
|---|---|---|---|---|---|---|---|---|---|---|---|
| Pigment | MA600 (carbon black, available from Mitsubishi Chemical Corporation) |  |  |  |  |  |  |  |  | 10 | 10 |
| Surface-treated pigment | P-1 (surface-treated with PEROYL L) | 12.5 |  |  |  |  |  | 12.5 |  |  |  |
|  | P-2 (surface-treated with dodecyl isocyanate) |  | 12.5 |  |  |  |  |  | 12.5 |  |  |
|  | P-3 (surface-treated with dodecyl amine) |  |  | 12.5 |  |  |  |  |  |  |  |
|  | P-4 (surface-treated with dodecyl mercaptan) |  |  |  | 12.5 | 12.5 | 12.5 |  |  |  |  |
| Polymer component | SOLSPERSE 18000 (available from The Lubrizol Corporation, 50% solids) |  |  |  |  |  |  |  |  | 5 |  |
| Dispersing solvent | AF-7 | 40 | 40 | 40 | 40 |  |  | 40 | 40 | 40 | 40 |
|  | AF-6 |  |  |  |  |  |  | 47.5 | 47.5 |  |  |
|  | Isomyristyl alcohol | 7.5 | 7.5 | 7.5 | 7.5 | 7.5 | 7.5 |  |  | 7.5 | 7.5 |
|  | DP | 40 | 40 | 40 | 40 | 80 | 40 |  |  | 37.5 | 42.5 |
|  | Triethylene glycol monoethylether |  |  |  |  |  | 40 |  |  |  |  |
| Total |  | 100 | 100 | 100 | 100 | 100 | 100 | 100 | 100 | 100 | 100 |
| Evaluation | Specific heat J/(g · K) | 2.1 | 2.1 | 2.1 | 2.1 | 2.4 | 2.9 | 1.8 | 1.8 | 2.1 | 2.1 |
|  | Dispersion Stability | Good | Good | Good | Good | Good | Good | Good | Good | Good | Bad |
|  | Time required for worming up | Good | Good | Good | Good | Good | Acceptable | Good | Good | Bad | — | based on this result, that the specific heat of an ink containing a higher fatty acid ester and/or a hydrocarbon solvent in an amount of 50 mass % or more relative to the total solvent can be kept low, that a hydrocarbon solvent is more effective to keep the specific heat low than a higher fatty acid ester, and that an ink containing a hydrocarbon solvent in an amount of 50 mass % or more relative to the total solvent can have even lower specific heat and is effective to reduce the time required for warming up.

It should be noted that, although carbon black was used as the pigment in the Examples of the present invention, it is estimated that the pigment dispersion effect by grafting a long-chain alkyl group onto the surface of the pigment will be achieved when other pigments are used.

The invention claimed is:

1. A non-aqueous pigment ink comprising at least a non-aqueous solvent and a self-dispersed pigment, wherein the self-dispersed pigment includes a pigment and graft chains that include alkyl groups with a carbon number of 8-22, which are bound to the surface of the pigment.

2. The non-aqueous pigment ink as claimed in claim 1, wherein the alkyl groups are bound to the surface via COO groups, S groups, NHCOO groups, NRCOO groups, or by salt formation by amino groups, wherein R is a straight chain alkyl group or a branched alkyl group having a carbon number of 1 to 22.

3. The non-aqueous pigment ink as claimed in claim 2, wherein the alkyl groups are bound to the surface via COO groups, S groups, NHCOO groups, or NRCOO groups.

4. The non-aqueous pigment ink as claimed in claim 1, wherein the alkyl groups are at least one of octyl groups, 2-ethyl hexyl groups, dodecyl groups, myristyl groups, cetyl groups, stearyl groups, isostearyl groups, behenyl groups, and oleyl groups.

5. The non aqueous pigment ink as claimed in claim 2, wherein the alkyl groups are at least one of octyl groups, 2-ethyl hexyl groups, dodecyl groups, myristyl groups, cetyl groups, stearyl groups, isostearyl groups, behenyl groups, and oleyl groups.

6. The non aqueous pigment ink as claimed in claim 1, wherein the amount of the graft chains bound to the pigment is 0.1 to 30 by mass when the mass of the pigment is designated as 1.

7. The non aqueous pigment ink as claimed in claim 2, wherein the amount of the graft chains bound to the pigment is 0.1 to 30 by mass when the mass of the pigment is designated as 1.

8. The non-aqueous pigment ink as claimed in claim 4, wherein:
the amount of the graft chains bound to the pigment is 0.1 to 30 by mass when the mass of the pigment is designated as 1;
the pigment is carbon black;
the non-aqueous solvent is a non-polar organic solvent and/or a polar organic solvent, which has a 50% distillation point of 150° C. or more;
the ink is an inkjet ink;
the content of a polymer component in the ink is 20 mass percentage or less relative to the pigment, and the ink has a specific heat of 3.0 J/(g·K) or less;
the ink has a specific heat of 2.5 J/(g·K) or less, and
the non-aqueous solvent is a higher fatty acid ester and/or a hydrocarbon solvent, and the non-aqueous solvent is present in an amount of 50 mass percentage or more of the total amount of solvent.

9. The non-aqueous pigment ink as claimed in claim 8, wherein the non-aqueous solvent is a hydrocarbon solvent.

10. The non-aqueous pigment ink as claimed in claim 5, wherein:
the amount of the graft chains bound to the pigment is 0.1 to 30 by mass when the mass of the pigment is designated as 1;
the non-aqueous solvent is a non-polar organic solvent and/or a polar organic solvent, which has a 50% distillation point of 150° C. or more;
the ink is an inkjet ink;
the content of a polymer component in the ink is 20 mass percentage or less relative to the pigment and the ink has a specific heat of 3.0 J/(g·K) or less;
the ink has a specific heat of 2.5 J/(g·K) or less; and
the non-aqueous solvent is a higher fatty acid ester and/or a hydrocarbon solvent, and the non-aqueous solvent is present in an amount of 50 mass percentage or more of the total amount of solvent.

11. The non-aqueous pigment ink as claimed in claim 10, wherein the non-aqueous solvent is a hydrocarbon solvent.

12. The non-aqueous pigment ink as claimed in claim 1, wherein the non-aqueous solvent is a higher fatty acid ester and/or a hydrocarbon solvent, and the non-aqueous solvent is present in an amount of 50 mass percentage or more of the total amount of solvent.

13. The non-aqueous pigment ink as claimed in claim 12, wherein the non-aqueous solvent is a hydrocarbon solvent.

14. The non-aqueous pigment ink as claimed in claim 1, wherein the pigment is at least one of:
i) an inorganic pigment selected from the group consisting of colcothar, cobalt blue, ultramarine, iron blue, carbon black, calcium carbonate, kaolin, clay, barium sulfate, talc, or any combination thereof; or
ii) an organic pigment.

15. The non-aqueous pigment ink as claimed in claim 14, wherein the non-aqueous solvent is a higher fatty acid ester and/or a hydrocarbon solvent, and the non-aqueous solvent is present in an amount of 50 mass percentage or more of the total amount of solvent.

16. The non-aqueous pigment ink as claimed in claim 15, wherein the non-aqueous solvent is a hydrocarbon solvent.

17. The non-aqueous pigment ink as claimed in claim 1, wherein the pigment is carbon black.

18. The non-aqueous pigment ink as claimed in claim 1, wherein the pigment is an organic pigment.

19. The non-aqueous pigment ink as claimed in claim 1, wherein substantially no polymer component is contained.

20. The non-aqueous pigment ink as claimed in claim 1, wherein the molecular weight of a graft chain that binds to the pigment is 400 or less.

* * * * *